(12) United States Patent
Armand et al.

(10) Patent No.: US 8,321,318 B2
(45) Date of Patent: Nov. 27, 2012

(54) SYSTEM AND METHOD FOR FACILITATING THE FUNDING AND ADMINISTRATION OF A LONG TERM INVESTEMENT OR RETIREMENT TRUST

(75) Inventors: Glen Armand, Warrenton, VA (US); Lawrence J. Eisenberg, Gaithersburg, MD (US)

(73) Assignee: National Trust and Fiduciary Services Company, Inc., St. Thomas (VG)

( * ) Notice: Subject to any disclaimer, the term of this patent is extended or adjusted under 35 U.S.C. 154(b) by 1706 days.

(21) Appl. No.: 11/437,364

(22) Filed: May 19, 2006

(65) Prior Publication Data

US 2007/0288396 A1    Dec. 13, 2007

(51) Int. Cl.
*G06Q 40/00* (2012.01)
(52) U.S. Cl. .............. 705/36 R; 705/35; 705/37; 705/4; 705/1.1
(58) Field of Classification Search ................ 705/1, 36, 705/1.1, 36 R, 40, 35, 4, 37, 2, 39; 707/5; 235/380
See application file for complete search history.

(56) References Cited

U.S. PATENT DOCUMENTS

| 4,722,055 | A | | 1/1988 | Roberts |
| 4,752,877 | A | | 6/1988 | Roberts et al. |
| 4,876,648 | A | | 10/1989 | Lloyd |
| 6,064,986 | A | * | 5/2000 | Edelman ............ 705/36 R |
| 6,085,174 | A | | 7/2000 | Edelman |
| 2002/0040339 | A1 | * | 4/2002 | Dhar et al. ............ 705/38 |
| 2005/0044028 | A1 | | 2/2005 | Torres |

OTHER PUBLICATIONS

Office Action, Related U.S. Appl. No. 11/724,351, Nov. 28, 2008, United States Patent Office.
Office Action, Related U.S. Appl. No. 11/724,351, Sep. 4, 2009, United States Patent Office.

* cited by examiner

*Primary Examiner* — John H Holly
(74) *Attorney, Agent, or Firm* — Williams Mullen PC; Thomas F. Bergert (57) ABSTRACT

The funding and administration of a long term investment and/or retirement trust for a minor child or minor children are facilitated by the present invention. In one embodiment, the present invention provides a system and method for the real-time, interactive, dynamic modeling and goal-solving for the pre-funding of a retirement benefit account specific to a minor child. In another embodiment, the present invention provides a system and method for the input of user variables specific to the requirements necessary for the real-time production of trust documents necessary and specific to the purpose of establishing a funded pre-retirement trust for a minor child.

26 Claims, 11 Drawing Sheets

Projected Benefit Illustration Matrix
Inflation Adjusted - Single Contribution - Lump Sum Assumed Retirement at Age: 65
Assumed Initial Contribution (Minimum Initial Contribution is $1,500): $1,000.00
Assumed Rate of Inflation: 2.50%

| Current Age of Child | Average Gov Bond Yield | | | | | Average Blended Yield* | Average Large Cap Stocks Yield | Average Mid Cap Stocks Yield | Average Small Cap Stocks Yield |
|---|---|---|---|---|---|---|---|---|---|
| | 6.00% | 7.00% | 8.00% | 9.00% | 10.00% | 10.25% | 11.00% | 11.75% | 12.50% |
| 0 | $6,412.09 | $17,480.70 | $32,464.59 | $59,941.07 | $110,039.90 | $123,052.04 | $200,878.28 | $319,996.05 | $490,370.73 |
| 1 | $6,231.38 | $16,727.94 | $30,772.12 | $56,282.70 | $102,362.70 | $114,270.36 | $185,141.27 | $292,822.15 | $445,791.57 |
| 2 | $6,055.76 | $16,007.60 | $29,167.89 | $52,847.60 | $95,221.11 | $106,115.39 | $170,637.12 | $267,955.85 | $405,265.06 |
| 3 | $5,885.09 | $15,318.28 | $27,647.29 | $49,622.16 | $88,577.78 | $98,542.41 | $157,269.23 | $245,201.18 | $368,422.78 |
| 4 | $5,719.23 | $14,658.64 | $26,205.96 | $46,593.58 | $82,397.93 | $91,509.87 | $144,948.60 | $224,378.82 | $334,929.80 |
| 5 | $5,558.05 | $14,027.41 | $24,839.77 | $43,749.84 | $76,649.24 | $84,979.22 | $133,593.18 | $205,324.69 | $304,481.64 |
| 6 | $5,401.41 | $13,423.36 | $23,544.81 | $41,079.66 | $71,301.62 | $78,914.63 | $123,127.36 | $187,888.63 | $276,801.49 |
| 7 | $5,249.18 | $12,845.32 | $22,317.35 | $38,572.45 | $66,327.09 | $73,282.84 | $113,481.43 | $171,933.22 | $251,637.72 |
| 8 | $5,101.25 | $12,292.17 | $21,153.89 | $36,218.27 | $61,699.62 | $68,052.97 | $104,591.18 | $157,332.75 | $228,761.56 |
| 9 | $4,957.48 | $11,762.84 | $20,051.08 | $34,007.76 | $57,394.99 | $63,196.34 | $96,397.40 | $143,972.13 | $207,965.06 |
| 10 | $4,817.76 | $11,256.31 | $19,005.76 | $31,932.17 | $53,390.69 | $58,686.29 | $88,845.53 | $131,746.09 | $189,059.14 |
| 15 | $4,176.08 | $9,032.64 | $14,541.96 | $23,306.68 | $37,189.75 | $40,528.51 | $59,086.32 | $84,534.56 | $117,390.85 |
| 21 | $3,517.84 | $6,936.12 | $10,546.50 | $15,972.86 | $24,097.52 | $25,991.38 | $36,216.67 | $49,635.25 | $66,264.08 |

Projected Benefit Illustration Matrix
Inflation Adjusted Funding Matrix - Target Annual Benefit

| Assumed Retirement at Age | 65 |
| Target Benefit - *Annual* | $ 10,000.00 |
| Assumed Post Retirement Investment Yield | 6.50% |
| Assumed Life Expectancy After Retirement (Years) | 35 |
| Assumed Rate of Inflation | 3.00% |

| Current Age of Child | Average Gov Bond Yield 5.40% | 6.00% | 9.00% | 10.00% | Average Blended Yield* 10.49% | 11.00% | Average Large Cap Stocks Yield 11.06% | Average Mid Cap Stocks Yield 11.78% | Average Small Cap Stocks Yield 12.50% |
|---|---|---|---|---|---|---|---|---|---|
| 0 | $31,192.13 | $11,441.57 | $6,160.76 | $3,336.72 | $1,817.58 | $1,625.38 | $995.66 | $960.52 | $625.03 | $407.87 |
| 1 | $32,096.70 | $11,956.44 | $6,499.60 | $3,553.61 | $1,953.90 | $1,750.29 | $1,080.29 | $1,042.74 | $683.03 | $449.65 |
| 2 | $33,027.50 | $12,494.48 | $6,857.08 | $3,784.59 | $2,100.44 | $1,884.80 | $1,172.12 | $1,132.00 | $746.42 | $493.52 |
| 3 | $33,985.30 | $13,056.73 | $7,234.22 | $4,030.59 | $2,257.98 | $2,029.65 | $1,271.75 | $1,228.89 | $815.68 | $542.87 |
| 4 | $34,970.87 | $13,644.28 | $7,632.10 | $4,292.58 | $2,427.33 | $2,185.63 | $1,379.85 | $1,334.09 | $891.38 | $597.16 |
| 5 | $35,985.03 | $14,258.27 | $8,051.87 | $4,571.60 | $2,609.37 | $2,353.59 | $1,497.13 | $1,448.29 | $974.10 | $656.88 |
| 6 | $37,028.60 | $14,899.90 | $8,494.72 | $4,868.75 | $2,805.08 | $2,534.47 | $1,624.39 | $1,572.26 | $1,064.50 | $722.56 |
| 7 | $38,102.42 | $15,570.39 | $8,961.93 | $5,185.22 | $3,015.46 | $2,729.24 | $1,762.46 | $1,706.84 | $1,163.28 | $794.82 |
| 8 | $39,207.40 | $16,271.06 | $9,454.84 | $5,522.26 | $3,241.62 | $2,938.98 | $1,912.27 | $1,852.95 | $1,271.23 | $874.30 |
| 9 | $40,344.41 | $17,003.26 | $9,974.86 | $5,881.20 | $3,484.74 | $3,164.85 | $2,074.81 | $2,011.56 | $1,389.20 | $961.73 |
| 10 | $41,514.40 | $17,768.40 | $10,523.47 | $6,263.48 | $3,746.10 | $3,408.06 | $2,251.17 | $2,183.75 | $1,518.12 | $1,057.90 |
| 15 | $47,893.39 | $22,142.66 | $13,753.76 | $8,581.51 | $5,378.00 | $4,934.96 | $3,384.99 | $3,292.70 | $2,365.97 | $1,703.77 |
| 21 | $56,854.89 | $28,835.51 | $18,964.27 | $12,521.65 | $8,299.88 | $7,695.11 | $5,522.50 | $5,389.79 | $4,029.53 | $3,018.33 |

Projected Benefit Illustration Matrix
Single Contribution - Monthly Income

| Assumed Retirement at Age | 65 |
| Assumed Initial Contribution (Minimum Initial Contribution is $1,500) | $1,000.00 |
| Assumed Post Retirement Investment Yield | 6.50% |
| Assumed Life Expectancy After Retirement (Years) | 35 |

| Current Age of Child | Projected Monthly Benefit @ Age 65 | Average Gov Bond Yield | | | | Average Blended Yield* | Average Large Cap Stocks Yield | Average Mid Cap Stocks Yield | Average Small Cap Stocks Yield |
|---|---|---|---|---|---|---|---|---|---|---|---|
| | | 6.00% | 7.00% | 8.00% | 9.00% | 10.00% | 10.15% | 11.05% | 11.75% | 12.60% |
| 0 | $4,122.65 | $184.41 | $491.01 | $898.86 | $1,636.33 | $2,962.60 | $3,304.52 | $5,335.09 | $5,525.82 | $8,410.36 | $12,766.21 |
| 1 | $4,220.34 | $174.96 | $458.89 | $832.28 | $1,501.22 | $2,693.27 | $2,999.07 | $4,806.38 | $4,975.52 | $7,524.03 | $11,347.74 |
| 2 | $4,117.40 | $166.00 | $428.87 | $770.63 | $1,377.26 | $2,448.43 | $2,721.85 | $4,330.08 | $4,480.03 | $6,731.11 | $10,086.88 |
| 3 | $4,010.98 | $157.49 | $400.81 | $713.54 | $1,263.55 | $2,225.84 | $2,470.25 | $3,900.97 | $4,033.88 | $6,021.75 | $8,966.11 |
| 4 | $3,913.00 | $149.43 | $374.59 | $660.69 | $1,159.22 | $2,023.49 | $2,241.91 | $3,514.39 | $3,632.17 | $5,387.14 | $7,969.88 |
| 5 | $3,823.42 | $141.77 | $350.09 | $611.75 | $1,063.50 | $1,839.54 | $2,034.68 | $3,166.11 | $3,270.45 | $4,819.41 | $7,084.34 |
| 6 | $3,731.15 | $134.51 | $327.18 | $566.43 | $975.69 | $1,672.31 | $1,846.60 | $2,852.36 | $2,944.76 | $4,311.52 | $6,297.19 |
| 7 | $3,653.10 | $127.62 | $305.78 | $524.48 | $895.13 | $1,520.28 | $1,675.91 | $2,569.69 | $2,651.51 | $3,857.45 | $5,597.50 |
| 8 | $3,561.93 | $121.08 | $285.77 | $485.63 | $821.22 | $1,382.07 | $1,521.00 | $2,315.04 | $2,387.45 | $3,450.66 | $4,975.56 |
| 9 | $3,463.83 | $114.87 | $267.08 | $449.65 | $753.41 | $1,256.43 | $1,380.41 | $2,085.62 | $2,149.70 | $3,087.01 | $4,422.72 |
| 10 | $3,379.94 | $108.99 | $249.61 | $416.35 | $691.20 | $1,142.21 | $1,252.81 | $1,878.93 | $1,935.62 | $2,761.68 | $3,931.30 |
| 15 | $2,988.65 | $83.79 | $177.97 | $283.36 | $449.23 | $709.22 | $771.39 | $1,115.06 | $1,145.60 | $1,582.53 | $2,181.59 |
| 21 | $2,575.55 | $61.11 | $118.59 | $178.56 | $267.86 | $400.34 | $431.06 | $596.15 | $610.50 | $811.28 | $1,076.12 |

SYSTEM AND METHOD FOR FACILITATING THE FUNDING AND ADMINISTRATION OF A LONG TERM INVESTEMENT OR RETIREMENT TRUST

FIELD OF THE INVENTION

The present invention relates to investment vehicles, and more particularly to facilitating the funding and administration of a long term investment and/or retirement trust on behalf of young individuals.

BACKGROUND OF THE INVENTION

Various investment vehicles exist which allow individuals to save for certain future expenses or life events while enjoying certain beneficial tax treatment. College savings plans, retirement plans, trusts and annuities are examples of such vehicles.

Regarding retirement plans, the present age is witnessing a shift in how investment plans are established, as many company pension (i.e., defined benefit) plans are being replaced with defined contribution plans (e.g., 401(k) plans, individual retirement accounts (IRAs), SEP IRAs). Further, many individuals today are operating under the assumption that they may never see their Social Security benefits. As a result, people are less certain about how much money they can count on in their later years, and it is possible and unfortunate that many retirees will outlive their retirement savings.

The financial planning industry promotes many products, systems, books and tapes that educate individuals on how to safely set aside funds for use and enjoyment during the retirement years. However, there are no systems or products in place for funding and administering a long term investment and/or retirement trust for young people in accordance with the present invention.

SUMMARY OF THE INVENTION

The present invention provides a system and method for facilitating the funding and administration of a long term investment and/or retirement trust for minor children. In one embodiment, the present invention provides a system and method for the real-time, interactive, dynamic modeling and goal-solving for the pre-funding of a retirement benefit account specific to a minor child. In another embodiment, the present invention provides a system and method for the input of user variables specific to the requirements necessary for the real-time production of trust documents necessary and specific to the purpose of establishing a funded pre-retirement trust for a minor child.

BRIEF DESCRIPTION OF THE DRAWINGS

FIGS. 6 through 11 are sample interface displays associated with one embodiment of the investment modeling component of the present invention.

DETAILED DESCRIPTION OF THE PREFERRED EMBODIMENTS

As shown in FIGS. 1 through 5, there is provided a system 10 including an investment modeling and management system 12 connected by network 30 to various user systems 21-25. The user systems can be, for example, a grantor's computer system 21, a beneficiary's computer system 22, a trustee's computer system 23, an administrator's computer system 24 and an employer's computer system 25.

Figure 1:
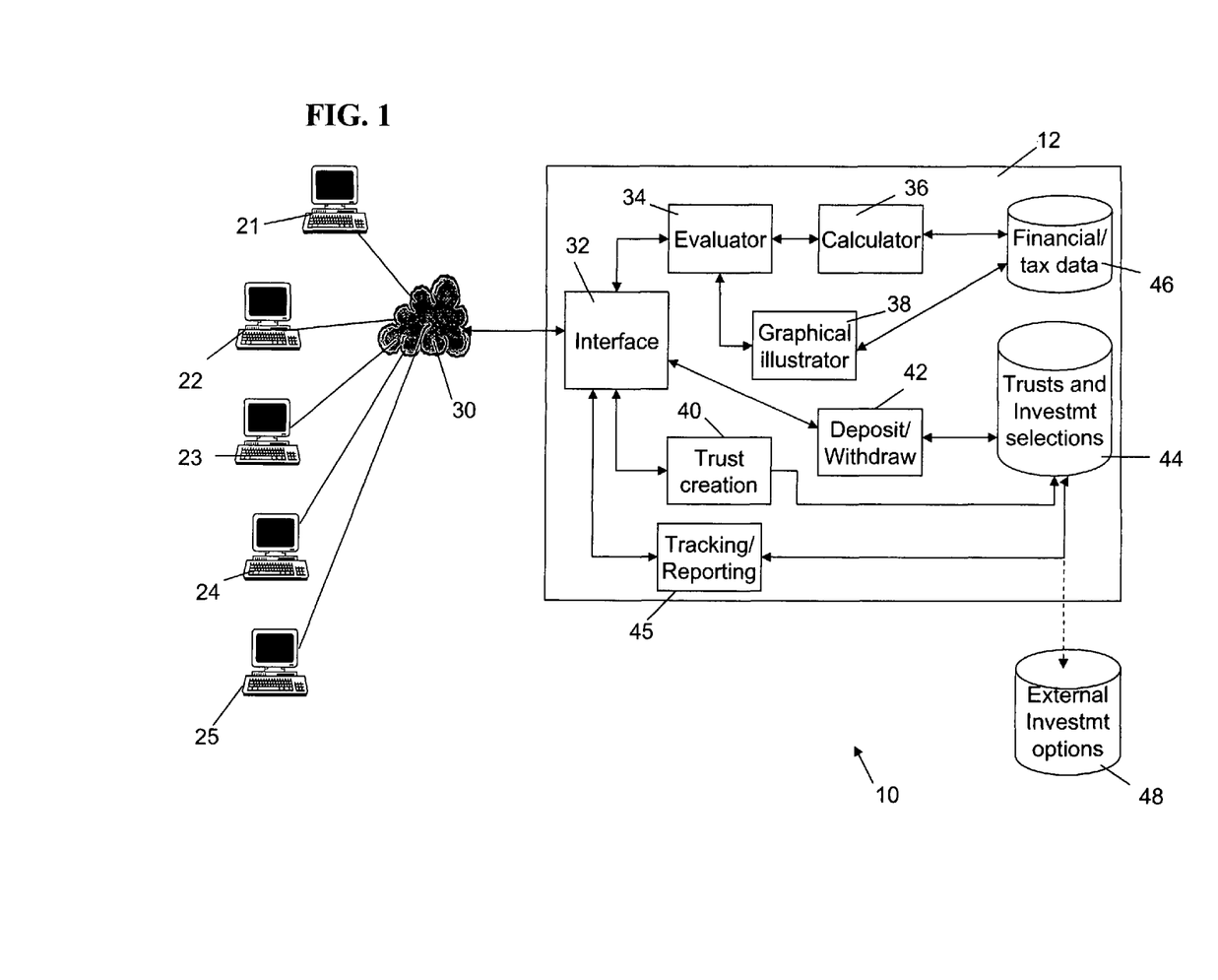
FIG. 1 is an exemplary schematic representation of one embodiment of the system of the present invention.

Within investment modeling and management system 12, there are provided various components that assist in carrying out the functions of the present invention. Interface component 32 provides a filter for allowing the various user systems 21-25 to interact with appropriate other components according to the user type and security measures as described more completely herein. Evaluator component 34 provides graphical user interfaces to help a user such as a grantor decide which investment option to use. For example, the system can provide the calculation and comparative graphical relationship representation of a level of funding made by the grantor to projected funding requirements to fulfill a specified target lump sum benefit or target annuitized benefit. Evaluator component can interact with calculator 36 and graphical illustrator 38, which have access to financial database 46 in performing their functions.

One aspect of evaluator component 34 provides user interfaces for receiving details about different user types. For example, with a grantor, the evaluator component can receive name, address, e-mail, telephone, and social security number (collectively, "identification data"). In assisting a grantor with investment decisions, the evaluator component can provide a user interface that receives possible terms for the investment. The investment terms can be, for example, (1) the amount of a targeted lump sum benefit (in today's dollars) desired, (2) the amount of a targeted annual annuity benefit (in today's dollars) desired, (3) the amount of a targeted monthly annuity benefit (in today's dollars) desired, (4) the current Social Security Income Benefit, (5) the average Social Security Income Benefit Cost of Living Adjustment, (6) the projected future Social Security Income Benefit, (7) the number of benefit periods desired (maximum of one), (8) the age at funding, (9) the amount of lump sum contributions, (10) the amount of additional contributions, (11) the number of additional funding contributions, (12) the pre-retirement interest rate assumption, (13) the post retirement interest assumption, and (14) the targeted age of the beneficiary's retirement age. The terms can also include, for example, whether the investment will be a retirement account, a retirement trust or other investment vehicle. It will be appreciated that not all of the investment terms will be required to be received by the evaluator component of the present invention before the evaluator can provide analysis.

Figure 2:
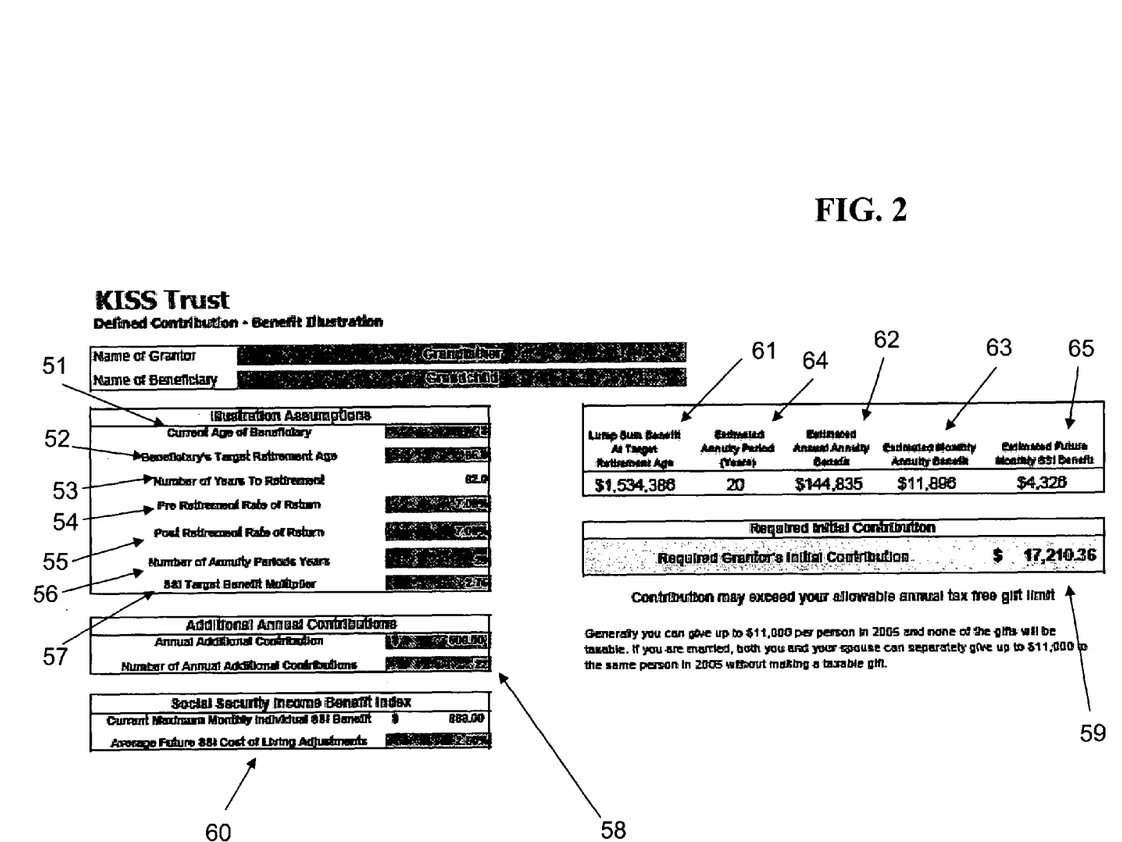
FIG. 2 is a sample interface for use in determining various investment options in accordance with the present invention.
Figure 3:
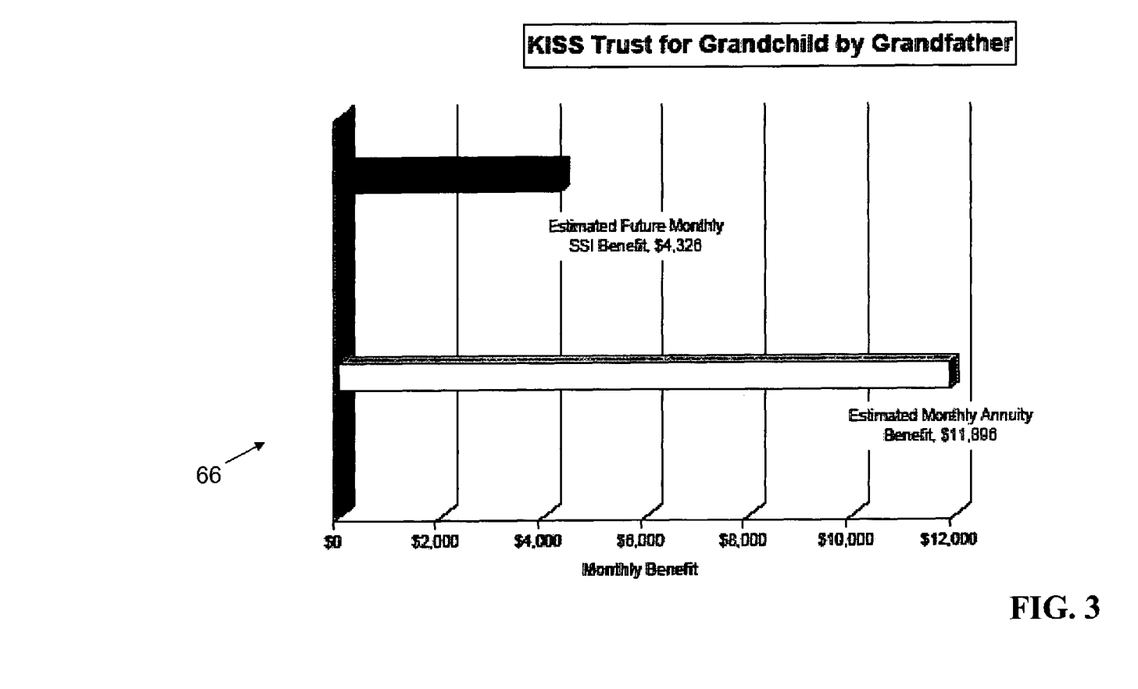
FIG. 3 shows a sample graphical illustration associated with an investment evaluation in accordance with the present invention.

Once evaluator component. 34 has received the user input, it can present the input to calculator component 36 and graphical illustrator component 38. Upon receiving the information from evaluator component 34, calculator component 36 can calculate the available investment opportunities with the optional assistance of data from financial database 46. For example, if the grantor is seeking to determine what defined benefit would result from a particular defined contribution for a three year old minor beginning when the minor retires at age 65, the grantor or a representative would input information as shown in FIG. 2. This inputted information can be represented as assumptions: the current age of the beneficiary as at 51, the beneficiary's target retirement age as at 52, the number of years to retirement as at 53, the pre-retirement rate of return as at 54, the post-retirement rate of return as at 55, the number of annuity periods in years as at 56, and the social security index target benefit multiplier as at 57. In one embodiment of the invention, the user can have the evaluator component consider the effect of additional annual contributions as at 58 beyond the grantor's initial contribution, which is identified at 59. The present invention can also consider the social security income (SSI) benefit index identified at 60 to help the grantor decide what defined contribution plan will help the minor reach a stated goal. Information such as the current maximum monthly individual SSI benefit can be obtained through financial database 46 in FIG. 1.

As shown further in FIG. 2, if the grantor in this example provides an initial lump sum contribution of $17,210.36 and twenty-two annual additional contributions of $500, then the lump sum benefit to the minor in sixty-two years will be $1,534,386 as shown at 61, given the assumptions illustrated at 51-59. This lump sum benefit can also be broken down according to estimated annual annuity benefits 62 or estimated monthly annuity benefits 63 based on the estimated annuity period of twenty years shown at 64. The estimated future monthly SSI benefit is also shown at 65.

By providing this information to the user, the user can determine how much he or she needs to contribute initially as well as annually (or on some other regular basis) in the form of ongoing contributions in order for the beneficiary to reach a certain lump or annuitized target. The present invention can also track tax information through database 46 in order to advise on how much the grantor may give as a tax free gift during any particular year. Graphical illustration component can provide various graphical representations for evaluation component to use in presenting results to users, such as the bar graph 66 shown in FIG. 3.

Evaluator component can operate to assist the user regardless of target goal metric. For example, if the user has a target goal for a future lump sum (e.g., $2 million), the present invention allows the user to modify parameters and assumptions accordingly. The user can also set a target goal based on a future annualized annuity or a future monthly annuity, for example. Additionally, the present invention allows the user to see the effect of particular defined contributions, whether the contribution is a single lump sum or a lump sum with a follow on of regular contributions.

It will be appreciated that, due to the investment being for a minor child, the investment option or selection would not include or be possible through a tax-deferred 401(k), IRA, SEP-IRA or even a pre-taxed Roth IRA, for example, because such vehicles require that the beneficiary be employed and have earned income. Thus, the investment option or selection cannot require that the minor child be employed and have earned income. Further, the investment option cannot include an investment option which includes an asset that can be consumed pre-retirement, such as a gift provided under the Uniform Gifts to Minors Act (UGMA), which can be controlled by a minor at age 18, for example. In addition, the investment option cannot include an asset that can be attachable by creditors, such as something which may be considered community property should the minor child marry later in life and then become divorced. Any community property in such divorce situations would be exposed to the ex-spouse; however, the present invention does not allow for this eventuality by providing investment options which cannot be considered community property and therefore subject to attachment by an ex-spouse, for example.

In one embodiment, the present invention can operate so that any investment options or selections involve assets that grow tax-deferred while not requiring the beneficiary to be employed or have earned income. IRAs and 401(k)'s allow assets to grow tax-deferred, but such vehicles also require that the individual be employed and have earned income. The present invention can allow the assets to grow tax-deferred without requiring that the minor child be employed or have earned income, thereby truly providing a system and method for facilitating the funding and administration of a long term investment or retirement trust for the benefit of a minor child. The child benefits because the assets are not attachable by creditors. The child further benefits by being a beneficiary of a tax-deferred investment without having to be employed or have earned income.

In addition to the components described above, the investment modeling and management system 12 also provides a trust creation component 40. The trust creation component provides for the real time production of one or more trust documents necessary and specific to the purpose of establishing a funded pre-retirement trust for a minor child, for example. This component allows the user, such as a grantor, to generate and establish trust documentation based on, for example, a desired option presented to the user using evaluation component. Once the trust documentation is established, the grantor or other user can fund the trust using deposit/withdrawal component 42. In one embodiment of the present invention, deposit/withdrawal component 42 is provided externally to investment processing and management system 12 and is tied directly to a financial institution such as a trustee bank or trustee insurance company, for example. Once the trust and initial funding are established, the trust terms and documentation can be stored in the database 44 for trust and investment selections.

It will be appreciated that the present invention can accommodate external systems communicating with deposit/withdrawal component 42 to facilitate seamless transaction processing. For example, if a grantor is a member of an affinity program, a computer system associated with the affinity program can communicate with modeling and managing component 12 in order to allow the grantor to direct affinity membership (financial) rewards into the investment. Similarly, round-up programs, which allow consumers to deposit change left over from a transaction into an account, can tie in to the deposit/withdrawal component to allow grantors to direct round-up money into the investment. Other programs such as vendor rebate programs, Section 529 or other college savings programs can similarly be interfaced with the deposit/withdrawal component 42. Additionally, employers can interface with the present invention in order to fund employee trusts (e.g., for the employee's children) through an employer matching or similar such program.

In creating trusts via trust creation component 40, the present invention can receive one or more of the following input variables, by way of example and without limitation: (1) Grantor Data (including name, address, SSN and other contact details (collectively, "identification data")), (2) Beneficiary identification data, (3) Guardian identification data, (4) Co-Trustee identification data and (5) Terms. In one embodiment of the present invention, the terms can include, for example, (a) the minimum age that the beneficiary may start receiving the benefit, (b) whether a lump sum benefit will be an allowable option (c) a Crummey Power Election, (d) the age at which the beneficiary may direct investment choices, (e) investment restrictions, and (f) whether an outside investment advisor will be permitted, in which case the name, address and other pertinent identification data of the outside investment advisor will be collected.

As further shown in FIG. 1, investment modeling and management system 12 can further be provided with a tracking/reporting component 45, which assists users such as trustees, trust administrators or overseers in tracking the performance and credit rating of insurance carriers, trust assets, investments, and trust laws, for example. If the credit rating available from Moody's, Fitch or other rating agency for an annuity provider (e.g., an insurance carrier) drops, the trust administrator may choose to notify the family trustee with possible recommendations for substitutes for the trustee's consideration. If the trustee wants to change the carrier, or redirect any investments, for example, the trustee can notify the trust administrator. In one embodiment of the present invention, the selected investments from the trust database 44 can be compared to other investment opportunities searchable through external database 48. In another embodiment of the present invention, the administrator or other user can track the trust laws pertaining to the situs of the trust. For example, if Maryland is the situs of a particular trust and the administrator discovers that the Maryland trust laws have changed to be less advantageous for grantors, beneficiaries or the trust itself, the administrator can then direct or recommend that a new trust be generated with a new situs using trust creation component 40. In one embodiment of the invention, changes in trust laws are automatically recorded by the present invention and automatic notices to trust administrators affected by such changes are provided via reporting component 45.

With regard to credit rating agencies, it will be appreciated that the present invention can provide a mechanism whereby the disparate rating options of two or more commonly known rating agencies, such as Moody's, Fitch, Standard & Poor's, for example, can be aggregated into a new, combined rating scale. By doing so, the present invention can simplify the evaluation and presentation of the ratings, as well as that of the products being rated.

The investment modeling and management system 12 thus provides for the real-time, interactive modeling for the pre-funding of an investment account or retirement benefit account for a minor child or other beneficiary. The present invention can assist regardless of investment goal and approach. For example, for a defined indexed targeted benefit, the evaluator component of the present invention can present a calculation and graphical representation of a single lump sum contribution funding required to create: (1) a targeted lump sum retirement benefit (based on today's dollars and adjusted for a stated inflation index factor), (2) a targeted annualized annuity retirement benefit (based on today's dollars and adjusted for a stated inflation index factor), or (3) a targeted monthly annuity retirement benefit (based on today's dollars and adjusted for a stated inflation index factor).

The input used in the above approach can include, for example, the amount of targeted of lump sum benefit (in today's dollars) desired, target benefit inflation index factor, number of benefit periods desired, minor child's age at funding, amount of additional contributions, number of additional funding contributions, pre-retirement interest rate assumption, post retirement interest rate assumption, and targeted age of the beneficiary's retirement age.

For a defined indexed targeted benefit with additional contributions, the evaluator component of the present invention can present a calculation and graphical representation of a defined initial lump sum contribution and a specified number of additional funding contributions to create: (1) a targeted lump sum retirement benefit (based on today's dollars and adjusted for a stated inflation index factor), (2) a targeted annualized annuity retirement benefit (based on today's dollars and adjusted for a stated inflation index factor), or (3) a targeted monthly annuity retirement benefit (based on today's dollars and adjusted for a stated inflation index factor).

The input used in the above approach can include, for example, the amount of targeted of lump sum benefit (in today's dollars) desired, target benefit inflation index factor, number of benefit periods desired (maximum of one), minor child's age at funding, amount of additional contributions, number of additional funding contributions, pre-retirement interest rate assumption, post retirement interest rate assumption, and targeted age of the beneficiary's retirement age.

It will be appreciated that the present invention operates using appropriate security and authentication mechanisms to prevent fraudulent or otherwise improper activities. In one embodiment of the invention, each user is provided with at least a user name and password which are required in order to log in to use the invention via computer or other remote electronic device. Other security and authentication mechanisms can be employed as are known in the art, including biometric identification technique and/or public key infrastructure (PKI), for example.

Figure 4:
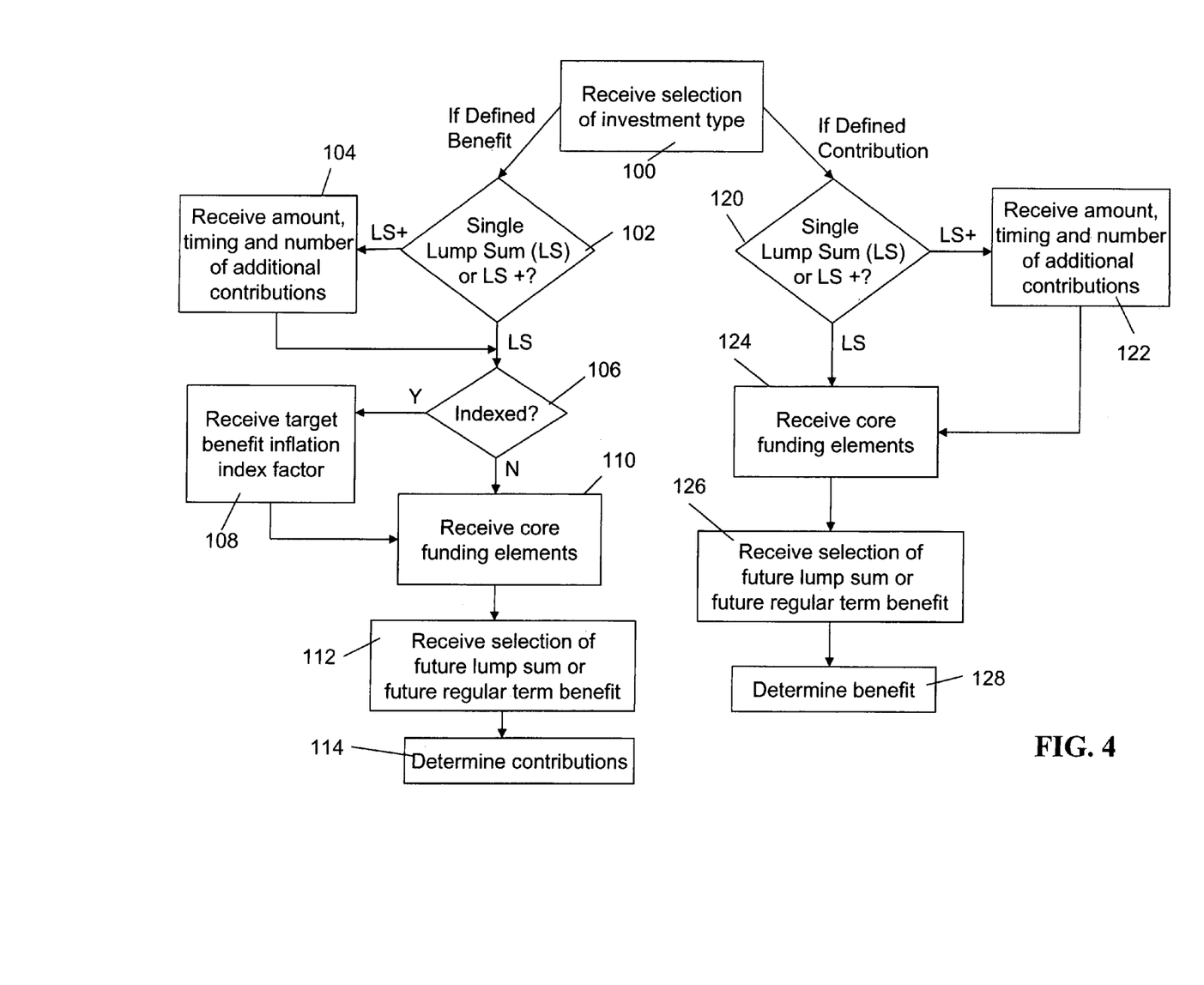
FIG. 4 shows a sample flow chart illustrating method steps in accordance with investment modeling aspects of the present invention.

FIG. 4 shows a sample flow chart illustrating method steps in accordance with various aspects of the present invention. At step 100, the present invention receives from the grantor a selection of the grantor's preferred investment type. If the grantor selects the defined benefit approach, then the grantor is queried as at 102 for whether he or she would like to view options pertaining to a single defined lump sum contribution (e.g., grantor would like to invest $20,000 all at one time with no further payments) or a single defined lump sum contribution plus additional periodic contributions. If the user determines that he or she would like to see options with additional periodic contributions, the user is queried to provide, and the system receives, information regarding the number, timing and amount of additional funding contributions as at 104. Once this information has been received, or if the user selects only a single lump sum contribution at step 102, then the system receives from the user an indication of whether the user would like to see indexed options (e.g., a benefit based on today's dollars and adjusted for a stated inflation index factor) as at 106. If so, then the system receives from the user a target benefit inflation index factor as at 108. Once this information has been received, or if the user does not desire to receive indexed option information, then the system of the present invention receives core funding elements as at 110. Such elements can include, for example, the amount of a targeted lump sum benefit (which can optionally be in today's dollars), the amount of a targeted annualized annuity benefit (which can optionally be in today's dollars), the amount of a targeted monthly annuity benefit (which can optionally be in today's dollars), a number of benefit periods desired (e.g., pay for 20 years), an age of the beneficiary at the time of funding, a pre-retirement interest rate assumption, a post retirement interest rate assumption, and/or a targeted age of the beneficiary at retirement. At step 112, the invention can receive a selection from the user regarding whether the determination is to be made based on a future lump sum benefit or a future regular term benefit (e.g., a periodic payment such as every month for 20 years, every year for 20 years, etc.). At step 114, the present invention can process the received data in order to calculate and determine contributions that would be required to meet the inputted criteria. The calculations and determination can be presented in a report or graphically, for example, as described above.

Referring again to FIG. 4, if the user at step 100 desires to determine the projected results of defined contributions to a particular retirement or investment plan, the user can be queried, as at step 120, for whether the defined contribution would be a single lump sum or a lump sum plus additional contributions. If the latter, then the user would provide information as to the amount, timing and number of additional funding contributions as at 122. Once this has been received, or if the user selected a single lump sum contribution, then the present invention would receive core funding elements as at step 124. Such elements can include, for example, the amount of a single lump sum contribution, a number of benefit periods desired (e.g., pay for 20 years), an age of the beneficiary at the time of funding, a pre-retirement interest rate assumption, a post retirement interest rate assumption, and/or a targeted age of the beneficiary at retirement. At step 126, the invention can then a selection from the user of a future lump sum benefit or a future regular interval payment. At step 128, the present invention can process the received data in order to calculate and determine contributions that would be required to meet the inputted criteria. The calculations and determination can be presented in a report or graphically, for example, as described above.

It will be appreciated that, while the above steps have been described in accordance with one method of the present invention, the steps can occur in a different order without necessarily affecting the outcome of the invention's determination. For example, the user can input a response to the indexed selection option prior to a response to the lump sum versus lump sum plus additional payments option. Additionally, it will be appreciated that the present invention can incorporate logic to facilitate accuracy of information receipt and investment calculations by restricting what fields can be accessed according to user selections. For example, if a user desires that the present invention determine a defined lump sum benefit to a beneficiary based on a single lump sum investment, then the field that would ordinarily accept information pertaining to the number of benefit periods would not be accessible. This is because a defined lump sum benefit would only be distributed once, and there would be no need for a user to enter a number of benefit periods.

Figure 6:
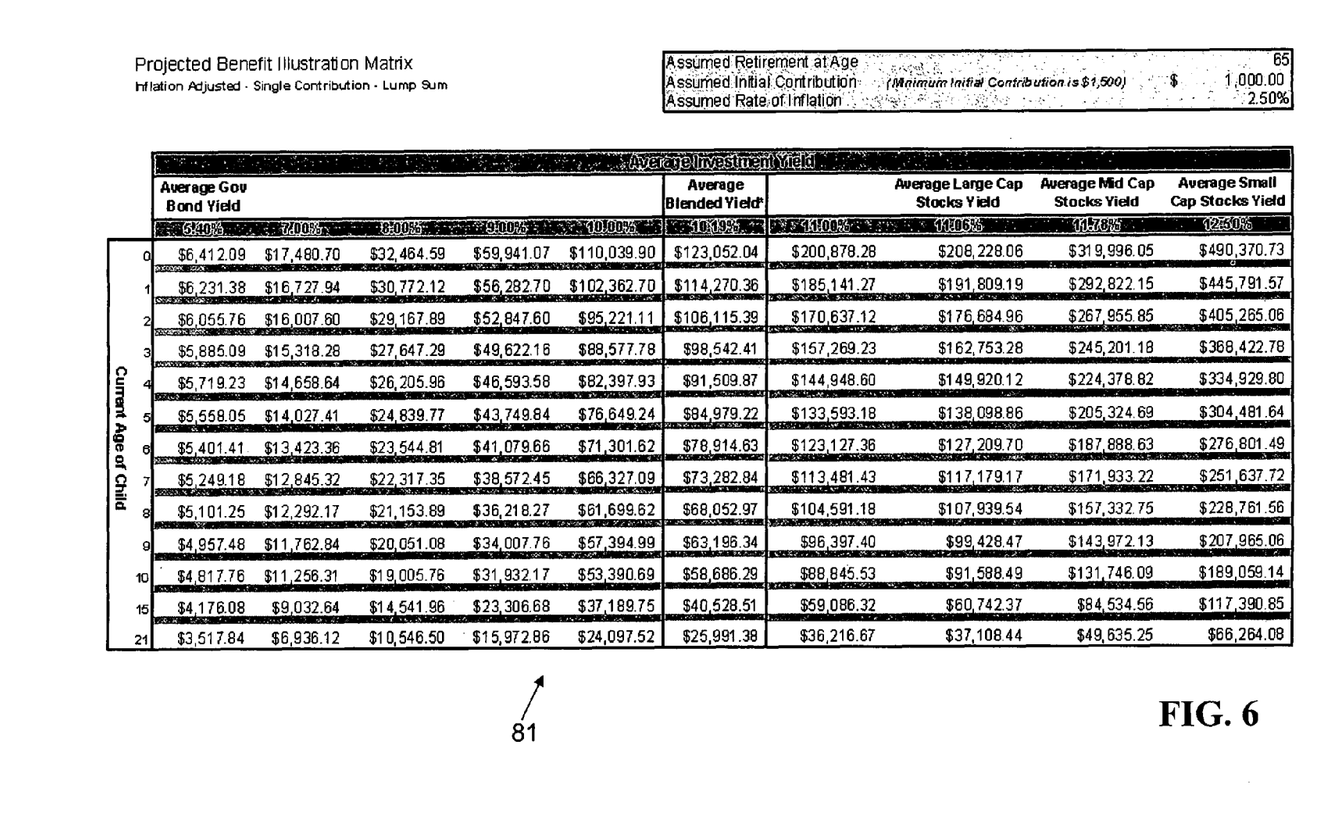
Figure 10:
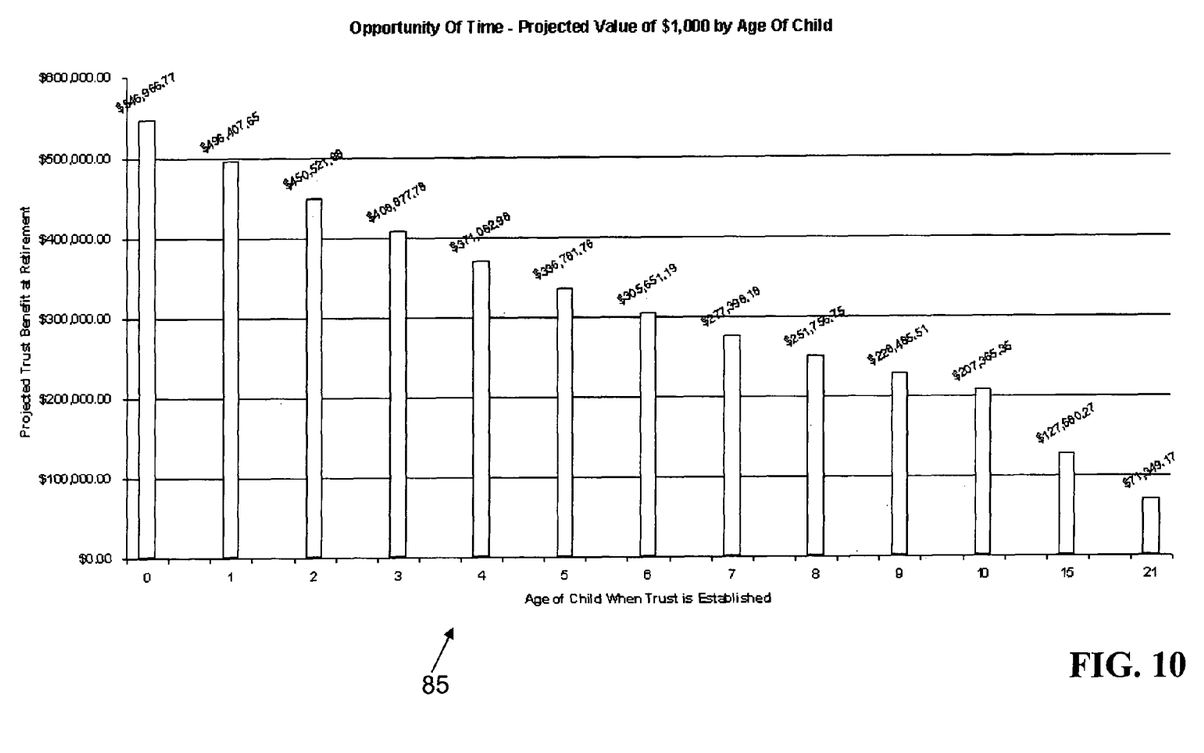
Figure 11:
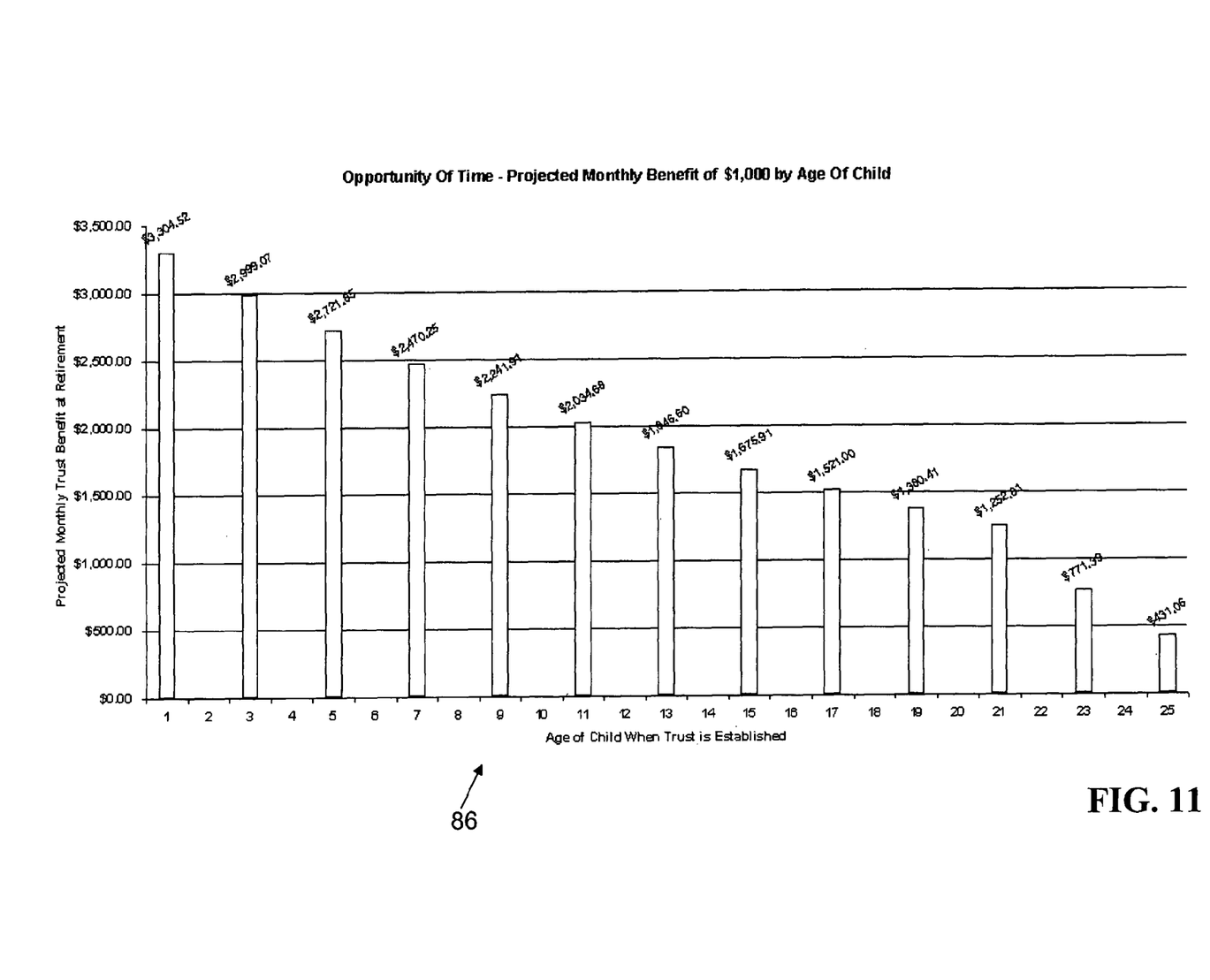

Various reports or graphical displays can be provided in accordance with the present invention. For example, FIG. 6 shows a tabular display 81 in the form of a projected benefit matrix, illustrating a projected lump sum benefit, inflation adjusted, based on a single contribution made at a given age and at different average rates of return. FIG. 7 is a sample display 82 showing projected benefit for a target annual benefit of $10,000 to begin at age 65 and continue for 35 years, adjusted for inflation and based on a single contribution made at a given age and at different average rates of return. FIG. 8 is a sample display 83 showing projected monthly benefit for a single contribution made at a given age and at different average rates of return. FIG. 9 shows a sample display 84 showing projected lump sum benefit for a single initial contribution with annual additional contributions made beginning at a given age and at different average annual rates of return. FIG. 10 shows a sample display 85 showing projected value over time of a $1000 gift depending upon the age of the child beneficiary when the gift is made, assuming a certain rate of return. FIG. 11 shows a sample display 86 showing projected monthly benefit at retirement of a $1000 gift depending upon the age of the child beneficiary when the gift is made, assuming a certain rate of return.

Reports can be sent regularly to the interested parties. In one embodiment of the present invention, reports are sent on an annual basis, thirty days before the birthday of the child, showing the current balance and the forecasted future values, assuming the same historical average rate of return is achieved. The reports can also illustrate the impact of small additional contributions (such as adding $100, $250 and $500 a year until age 18) in order to provide an incentive for grantors to provide additional trust funding.

Figure 5:
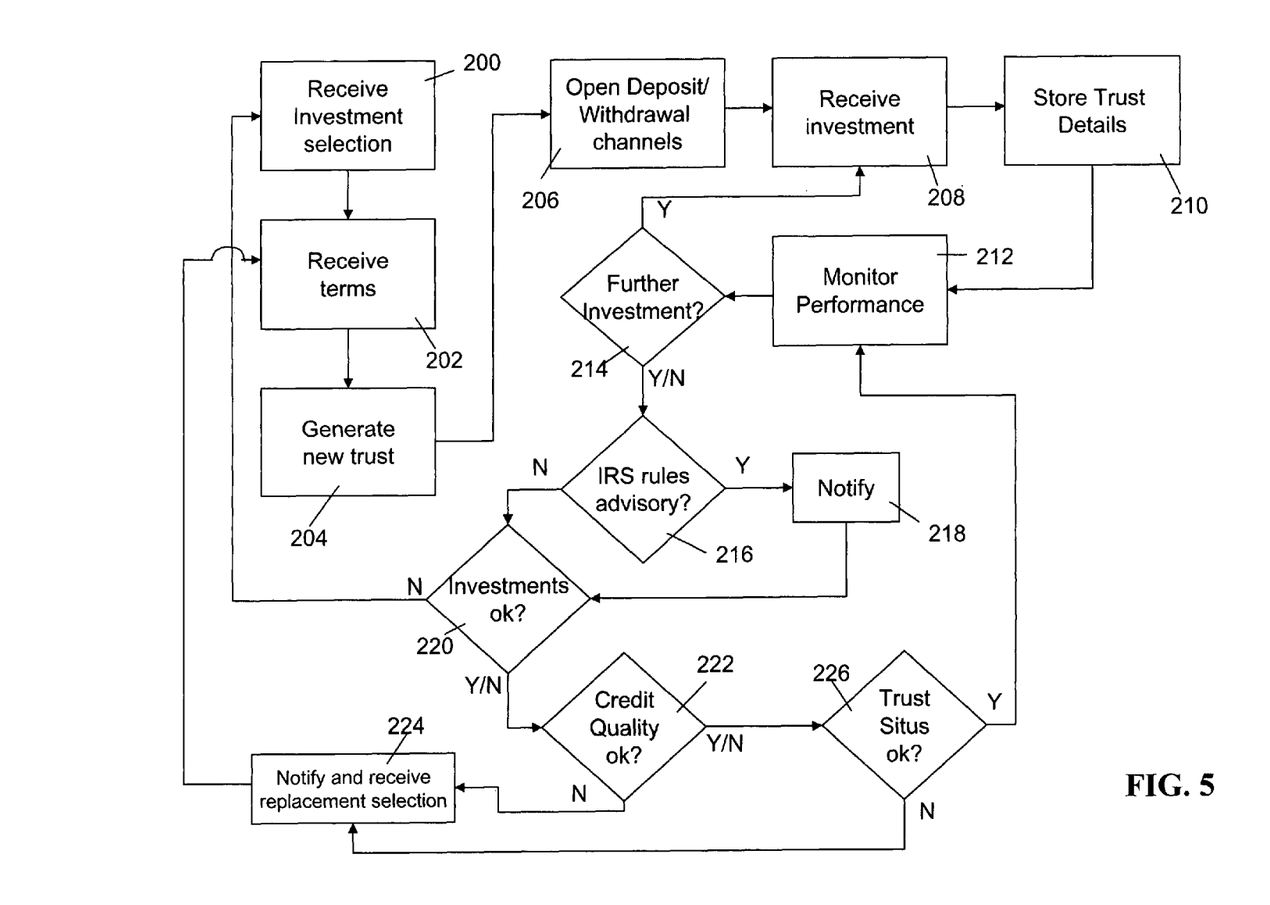
FIG. 5 shows a sample flow chart illustrating method steps in accordance with trust generation aspects of the present invention.

FIG. 5 shows a sample flow chart illustrating method steps in accordance with trust generation aspects of the present invention. As shown in FIG. 5, the present invention can receive an investment selection as at 200 from a user such as a grantor who wishes to establish a retirement trust for a minor child, for example. In one embodiment of the invention, the grantor will have already run one or more investment scenarios using the evaluator component of the present invention and decided upon an appropriate investment arrangement. As described above, the present invention provides a system that seamlessly allows the user to run different investment scenarios and then generate a trust based on a desired scenario in real time. After receiving the investment selection, the invention receives the terms of the trust as at 202, including such elements as (1) the identification data for the grantor, beneficiary, guardian (if any) and co-trustee (if any), (2) minimum age for the beneficiary to start receiving benefit, (3) allowance of lump sum benefit, (3) Crummey power election, (4) age in which the beneficiary can direct investment choices, (5) investment restrictions, and (6) whether an outside investment advisor is permitted and, if so, that advisor's identification data. At step 204, the present invention generates a new trust via trust creation component 40.

At step 206, the present invention opens the appropriate funding channels, including, for example, a channel to allow the grantor to deposit funds directly from other accounts, an affinity program channel (if any), a round-up program channel (if any), a vendor rebate channel (if any) and any other channels which may be necessary to allow funds to flow properly and simply into/out of the trust or investment vehicle. The funding channels can be established according to the terms of the trust, for example. At step 208, the initial investment is received, and at step 210 the trust details are stored such as in trust database 44 (in FIG. 1).

The trust performance and other characteristics affecting the trust are then continually and regularly monitored as at 212. If further investment is forthcoming at 214, whether by outside program or according to the regular additional trust deposits previously arranged for, the investment is then received by the trust back at step 208 and the details recorded. Whether or not further investment is received, the monitoring component will also check to see if an IRS rules advisory notification is in order as at 216. In one embodiment, the present invention allows the user to test and administer contributions by the grantor and notify the grantor when such contributions exceed Internal Revenue Service (IRS) nontaxable gift limits. The present invention can also notify the grantor of IRS gift limits necessary to avoid gift tax liabilities. Such notifications occur as at 218. Whether or not a notification occurs, the monitoring component will also check to see whether the trust investments are performing satisfactorily as at 220. Such evaluation can be based on trust definitions, a review by the grantor, administrator, overseer, beneficiary or the optional outside advisor, for example. If the performance is not deemed satisfactory, then new investment selections are received at step 200 and the full process flow begins again.

Whether or not the investments are acceptable, the monitoring component will also monitor the credit quality of the insurance company which underwrites an annuity held in trust as at 222, for example, as specified in the trust document being administered. This monitoring can be initiated by the administrator in one embodiment of the present invention. The present invention also allows the user to establish and maintain a database of the third party credit and financial rating organizations credit quality scores as specified in the trust document being administered. The present invention further allows the user to identify any insurance carrier dropping below the credit quality criteria as specified in the trust document being administered. In another embodiment, the present invention provides for reports to the trustee where an insurance company has failed to maintain the minimum credit quality criteria as specified in the trust document being administered. The present invention can further provide for the production of an annual hard copy report of the grantor, beneficiary, guardian of the beneficiary, trustee and co-trustee demonstrating the history of the third party credit quality scores. The present invention can also provide for the production of a hard copy and email notification by the trustee to the grantor, beneficiary, guardian of the beneficiary, and co-trustee the condition where an insurance company has failed to maintain the minimum credit quality criteria as specified in the trust document being administered.

All such notifications occur as at step 224, and the present invention also allows the grantor, beneficiary, or guardian of the beneficiary to elect to make a tax free exchange of the existing annuity for a replacement annuity where an insurance company has failed to maintain the minimum credit quality criteria as specified in the trust document being administered. In such cases, the process returns to the step of receiving the trust terms as at 202 and generating the new trust as at 204.

Whether or not the credit monitoring results are unsatisfactory, the monitoring component of the present invention also provides for the monitoring of state laws to determine whether the trust situs is acceptable at 226 as described above. If not, proper notifications are sent, and a selection of a replacement situs can be received as at 224.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A system for facilitating the modeling of long term investment options or retirement trust options on behalf of a minor child, comprising:
    an input component receiving, from a trust grantor, a type selection of defined benefit or defined contribution, a contribution form selection of single lump sum or lump sum plus at least one additional contribution, a benefit form selection of lump sum or annuitized, core funding elements including at least the amount of a targeted benefit or contribution, an age of the beneficiary at the time of funding and a targeted age of the beneficiary at retirement, the input component further capable of receiving an initial investment from the grantor pertaining to the contribution form selection;
    an investment options evaluation component for determining at least one trust investment option based upon said selected type, selected form, and core funding elements, wherein the investment options evaluation component cannot determine at least one investment option which requires that the minor child be employed and have earned income; and
    a trust creation component for generating a retirement trust in real time based on a selection by the trust grantor of the at least one trust investment option.

2. The system of claim 1 further including at least one trust deposit and withdrawal channel which allows a trust grantor or the employer of the trust grantor to deposit funds into the trust.

3. The system of claim 1 where, upon said contribution form being lump sum plus at least one additional contribution, receiving, from the user, an amount of said lump sum, an amount of said at least one additional contribution and a timing interval for receiving said at least one additional contribution.

4. A system for facilitating the modeling of long term investment options or retirement trust options on behalf of a minor child, comprising:
    an input component receiving, from a trust grantor, a type selection of defined benefit or defined contribution, a contribution form selection of single lump sum or lump sum plus at least one additional contribution, a benefit form selection of lump sum or annuitized, core funding elements including at least the amount of a targeted benefit or contribution, an age of the beneficiary at the time of funding and a targeted age of the beneficiary at retirement, the input component further capable of receiving an initial investment from the grantor pertaining to the contribution form selection;
    an investment options evaluation component for determining at least one trust investment option based upon said selected type, selected form, and core funding elements, wherein the investment options evaluation component cannot determine at least one investment option which includes an asset that can be consumed by the minor child pre-retirement; and
    a trust creation component for generating a retirement trust in real time based on a selection by the trust grantor of the at least one trust investment option.

5. A system for facilitating the modeling of long term investment options or retirement trust options on behalf of a minor child, comprising:
    an input component receiving, from a trust grantor, a type selection of defined benefit or defined contribution, a contribution form selection of single lump sum or lump sum plus at least one additional contribution, a benefit form selection of lump sum or annuitized, core funding elements including at least the amount of a targeted benefit or contribution, an age of the beneficiary at the time of funding and a targeted age of the beneficiary at retirement, the input component further capable of receiving an initial investment from the grantor pertaining to the contribution form selection;

an investment options evaluation component for determining at least one trust investment option based upon said selected type, selected form, and core funding elements, wherein the investment options evaluation component cannot determine at least one investment option which includes an asset that can be attachable by creditors; and a trust creation component for generating a retirement trust in real time based on a selection by the trust grantor of the at least one trust investment option.

6. A system for facilitating the modeling of long term investment options or retirement trust options on behalf of a minor child, comprising:

an input component receiving, from a trust grantor, a type selection of defined benefit or defined contribution, a contribution form selection of single lump sum or lump sum plus at least one additional contribution, a benefit form selection of lump sum or annuitized, core funding elements including at least the amount of a targeted benefit or contribution, an age of the beneficiary at the time of funding and a targeted age of the beneficiary at retirement, the input component further capable of receiving an initial investment from the grantor pertaining to the contribution form selection;

an investment options evaluation component for determining at least one trust investment option based upon said selected type, selected form, and core funding elements;

a trust creation component for generating a retirement trust in real time based on a selection by the trust grantor of the at least one trust investment option; and at least one trust deposit and withdrawal channel which allows an affinity program, round-up program or vendor rebate program to deposit funds into the trust.

7. A system for facilitating the establishment, funding and administration of a long term investment or retirement trust on behalf of a minor child, comprising:

an investment modeling component having access to first financial data and capable of providing a plurality of investment options based upon receiving defined information from a trust grantor including at least a lump sum benefit amount, lump sum contribution amount, annuitized benefit amount or annuitized contribution amount as an investment goal designation, wherein the investment modeling component cannot provide an investment option which includes an asset that can be attachable by creditors;

a trust creation component in communication with the investment modeling component, the trust creation component capable of receiving a selection, from the trust grantor, of an investment option provided by the investment modeling component, and further capable of creating a trust in real time based on said investment option;

an interface for receiving input from at least one external computer system;

a trust storage component;

a trust monitoring component in communication with the external computer system; and a trust reporting component in communication with the external computer system.

8. The system of claim 7 wherein the investment options are further created based upon the current Social Security Income Benefit, the average Social Security Income Benefit Cost of Living Adjustment, and the projected future Social Security Income Benefit.

9. The system of claim 7 wherein the investment options are further created based upon the number of benefit periods desired.

10. The system of claim 7 wherein the investment options are further created based upon the beneficiary's age at funding.

11. The system of claim 7 wherein the investment options are further created based upon the amount of lump sum contributions.

12. The system of claim 7 wherein the investment options are further created based upon the amount of additional contributions and the number of additional funding contributions.

13. The system of claim 7 wherein the investment options are further created based upon the pre-retirement interest rate assumption or the post retirement interest assumption.

14. The system of claim 7 further including a deposit/withdrawal component in communication with at least one external system and with the trust storage component.

15. A method for modeling options for a long term investment or retirement trust on behalf of a minor child, comprising the steps of:

causing at least one processor to execute a plurality of instructions stored in at least one memory device to receive, from a trust grantor, a type selection of defined benefit or defined contribution for the trust;

causing the at least one processor to execute a plurality of instructions stored in at least one memory device to receive, from the trust grantor, a contribution form selection of single lump sum or lump sum plus at least one additional contribution;

causing the at least one processor to execute a plurality of instructions stored in at least one memory device to receive, from the trust grantor, a benefit form selection of lump sum or annuitized, and upon said benefit form selection being annuitized, receiving, from the user, a selection of monthly annuitized or yearly annuitized;

causing the at least one processor to execute a plurality of instructions stored in at least one memory device to receive, from the trust grantor, core funding elements including at least the amount of a targeted benefit or contribution, an age of the beneficiary at the time of funding and a targeted age of the beneficiary at retirement;

causing the at least one processor to execute a plurality of instructions stored in at least one memory device to determine, a trust investment option based upon said selected type, selected form, and core funding elements, wherein the computer cannot determine an investment option which includes an asset that can be attachable by creditors; and causing the at least one processor to execute a plurality of instructions stored in at least one memory device to generate, a retirement trust in real time based on the determined trust investment option.

16. The method of claim 15 including the further step of receiving, from a user, an interest rate assumption prior to the modeling step.

17. The method of claim 15 where, upon said contribution form being lump sum plus at least one additional contribution, receiving, from the user, an amount of said lump sum, an amount of said at least one additional contribution and a timing interval for receiving said at least one additional contribution.

18. The method of claim 15 wherein one of the core funding elements is a targeted benefit and wherein the targeted benefit received is a targeted lump sum benefit in current prices.

19. The method of claim 15 wherein one of the core funding elements is a targeted annualized annuity benefit in current prices.

20. The method of claim 15 wherein one of the core funding elements is a targeted monthly annuity benefit in current prices.

21. The method of claim 15 wherein one of the core funding elements includes a desired number of benefit periods.

22. A method for creating and funding a retirement trust on behalf of a minor child, comprising the steps of:

- causing at least one processor to execute a plurality of instructions stored in at least one memory device to receive, a trust investment selection from a trust grantor;
- causing the at least one processor to execute a plurality of instructions stored in at least one memory device to receive, trust terms from the trust grantor, including a designation of at least one investment vehicle and at least one trust underwriter;
- causing the at least one processor to execute a plurality of instructions stored in at least one memory device to generate, a trust in real time based on the investment selection and trust terms;
- opening trust deposit and withdrawal channels;
- receiving at least an initial trust funding in a first amount from the trust grantor;
- storing the trust terms and the first amount of the trust funding; and
- periodically receiving additional trust funding in additional amounts and storing the additional amounts wherein the additional trust funding amounts are provided by an affinity program, round-up program or vendor rebate program.

23. The method of claim 22 including the step of periodically monitoring the credit quality of said at least one trust underwriter and including the further step of periodically monitoring trust situs consequences for the user where, upon said credit quality or trust situs consequences being unsatisfactory, receiving instructions as to establishing a new trust with trust terms, receiving funding for said new trust in a new trust amount, and storing said new trust with trust terms and the new trust amount.

24. The method of claim 22 including the step of providing a periodic evaluation and report to the user of the performance of said investment vehicle where, upon the investment performance of the investment vehicle being unsatisfactory, receiving instructions as to transferring funds from the investment vehicle to an alternative investment vehicle.

25. The method of claim 24 wherein said alternative investment vehicle is selected by a trust grantor.

26. The method of claim 24 wherein the step of opening trust deposit and withdrawal channels includes opening a channel to at least an affinity program, a round-up program or a vendor rebate program.

* * * * *